US010523686B1

United States Patent
Mehta et al.

(10) Patent No.: US 10,523,686 B1
(45) Date of Patent: Dec. 31, 2019

(54) STOLEN CREDENTIAL USE PREVENTION ON A WEB SERVICE

(71) Applicant: Stealth Security, Inc., Berkeley, CA (US)

(72) Inventors: Shreyans Mehta, Los Altos, CA (US);
Ameya Talwalkar, Saratoga, CA (US);
Michael Barrett, Berkeley, CA (US);
David Weisman, San Mateo, CA (US)

(73) Assignee: Cequence Security, Inc., Sunnyvale, CA (US)

( * ) Notice: Subject to any disclaimer, the term of this patent is extended or adjusted under 35 U.S.C. 154(b) by 22 days.

(21) Appl. No.: 15/081,184

(22) Filed: Mar. 25, 2016

Related U.S. Application Data (60) Provisional application No. 62/138,789, filed on Mar. 26, 2015.

(51) Int. Cl.
  *H04L 29/06* (2006.01)
(52) U.S. Cl.
  CPC .......... *H04L 63/123* (2013.01); *H04L 63/102* (2013.01)
(58) Field of Classification Search
  None
  See application file for complete search history.

(56) References Cited

U.S. PATENT DOCUMENTS

| | | | | |
|---|---|---|---|---|
| 8,695,097 | B1* | 4/2014 | Mathes | H04L 63/08 726/25 |
| 2007/0006305 | A1* | 1/2007 | Florencio | H04L 63/14 726/22 |
| 2013/0254857 | A1* | 9/2013 | Bajenov | G06F 21/00 726/7 |
| 2014/0337937 | A1* | 11/2014 | Truskovsky | H04L 63/08 726/5 |

* cited by examiner

*Primary Examiner* — Fatoumata Traore (57) ABSTRACT

Techniques to facilitate securing web services from unauthorized access are disclosed herein. In at least one implementation, user interactions with a web service are monitored, and sets of the user interactions are generated per originator based on origination information associated with the user interactions. The sets of the user interactions are processed to identify credentials used to access the web service per originator. The credentials used to access the web service per originator are compared with compromised credentials stored in a database to identify one or more user accounts of the web service associated with an originator that used the compromised credentials found in the database. Security measures are applied for at least the one or more user accounts of the web service associated with the originator that used the compromised credentials found in the database.

20 Claims, 4 Drawing Sheets

STOLEN CREDENTIAL USE PREVENTION ON A WEB SERVICE

RELATED APPLICATIONS

This application claims the benefit of, and priority to, U.S. Provisional Patent Application No. 62/138,789, entitled "STOLEN CREDENTIAL USE PREVENTION ON A WEB SERVICE", filed Mar. 26, 2015, which is hereby incorporated by reference in its entirety for all purposes.

TECHNICAL BACKGROUND

Security of a web service is of upmost importance to both the operators of the service and its users. As more people utilize the Internet to communicate, conduct business transactions, and utilize other services, more threats to website security arise. Website owners, insurers, hosting services, and others involved in the provision of a web service typically strive to create a robust security infrastructure for a website to prevent nefarious individuals from compromising the site. However, despite these security precautions, a website could still be subject to intrusions by computer hackers, malware, viruses, and other malicious attacks. Websites may be vulnerable to security breaches for a variety of reasons, including security loopholes, direct attacks by malicious individuals or software applications, and other security threats.

With every security breach on a web service, user credentials such as usernames, passwords, credit card numbers, and other personal information may be stolen. To avoid the hassle of remembering different username and password combinations, account owners typically reuse the same credentials across different web services. Thus, if attackers get access to account credentials, even if specific to a single website, they often try using them on as many sites as possible. There is a good likelihood that these unauthorized users will gain access to several accounts on other sites that have not actually suffered any past security breaches. Such breaches, even if on a third party site, affect the legitimate account owners as well as the reputation of the site.

OVERVIEW

A method to facilitate securing web services from unauthorized access is disclosed. The method comprises monitoring user interactions with a web service. The method further comprises generating sets of the user interactions per originator based on origination information associated with the user interactions. The method further comprises processing the sets of the user interactions to identify credentials used to access the web service per originator. The method further comprises comparing the credentials used to access the web service per originator with compromised credentials stored in a database to identify one or more user accounts of the web service associated with an originator that used the compromised credentials found in the database. The method further comprises applying security measures for at least the one or more user accounts of the web service associated with the originator that used the compromised credentials found in the database.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

With every security breach on a web service, customer credentials such as usernames, passwords, credit card numbers, and other personal information may be stolen. These credentials are then often posted on websites such as pastebin.com or traded in the black market. To avoid the hassle of remembering different username and password combinations, account owners typically reuse the same credentials across different web services. Thus, if attackers get access to account credentials, even if specific to a single website, they try using them on as many sites as possible. There is a good likelihood that these unauthorized users will gain access to several accounts on other sites that have not actually suffered any past security breaches. Such breaches, even if on a third party site, affect the legitimate account owners as well as the reputation of the site.

Implementations are disclosed herein for preventing the use of stolen credentials on a web service. In at least one implementation, user account activity is monitored and credentials that are used to access a web service are extracted and compared with a database of stolen credentials. Various security measures may be taken if credentials are used that match the stolen credentials in the database.

Figure 1:
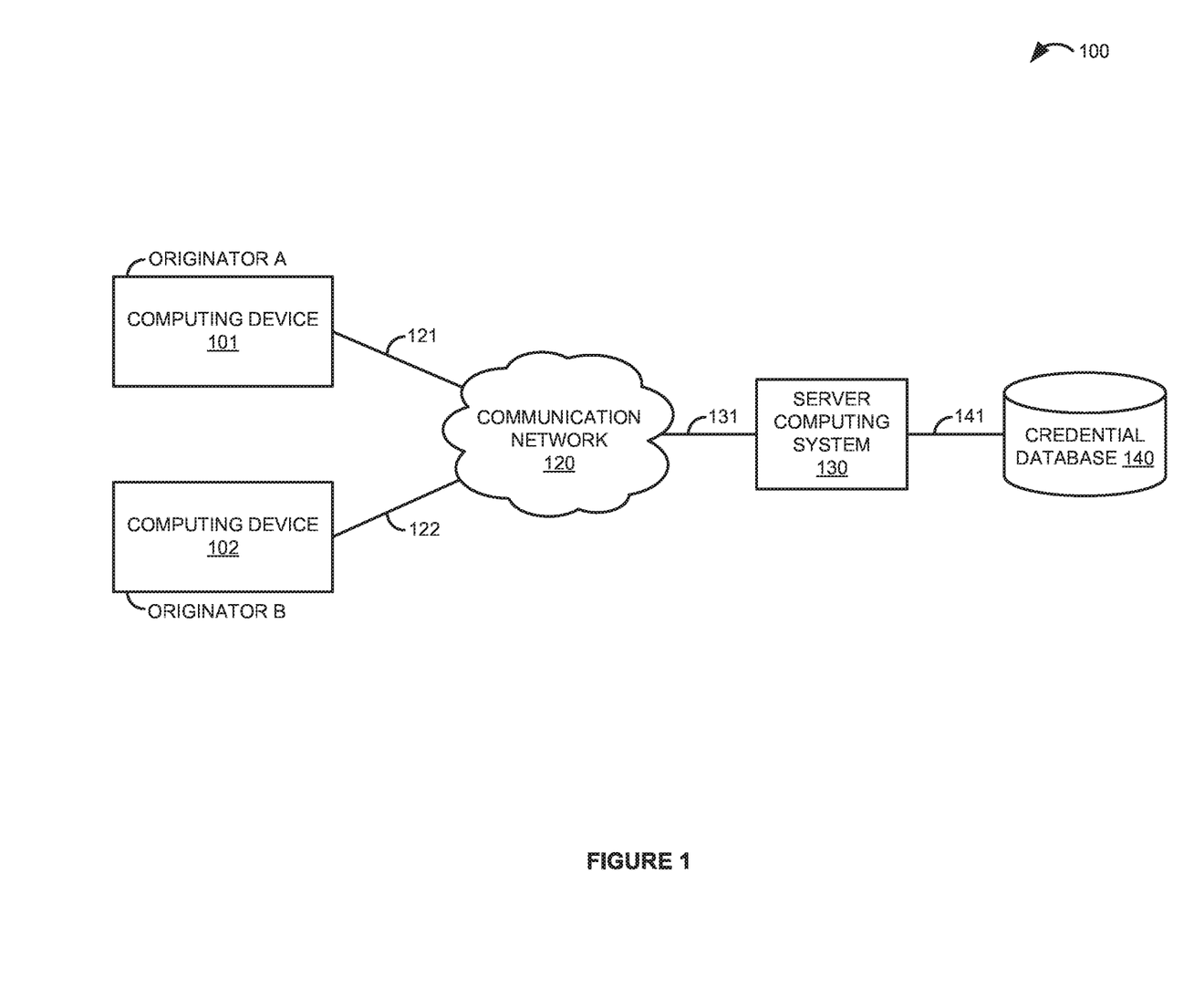
FIG. 1 is a block diagram that illustrates a communication system.

FIG. 1 is a block diagram that illustrates communication system 100. Communication system 100 includes computing devices 101 and 102, communication network 120, server computing system 130, and credential database 140. Computing device 101 and communication network 120 communicate over communication link 121, while computing device 102 and communication network 120 communicate over communication link 122. Communication network 120 and server computing system 130 are in communication over communication link 131. Server computing system 130 and credential database 140 communicate over communication link 141.

In operation, computing devices 101 and 102 typically submit web service requests to server computing system 130. Prior to or concurrently with the web service requests, computing devices 101 and 102 may be required to log in to the web service by providing a user name and password or some other account credentials to gain secure access to the web service. Unfortunately, some account credentials may become compromised, rendering them vulnerable to exploitation by malicious users. For example, stolen credentials may be posted online and used in attempts to gain access to the web service by illegitimate users. An exemplary implementation for securing the web service from unauthorized access will now be discussed with respect to FIG. 2.

Figure 2:
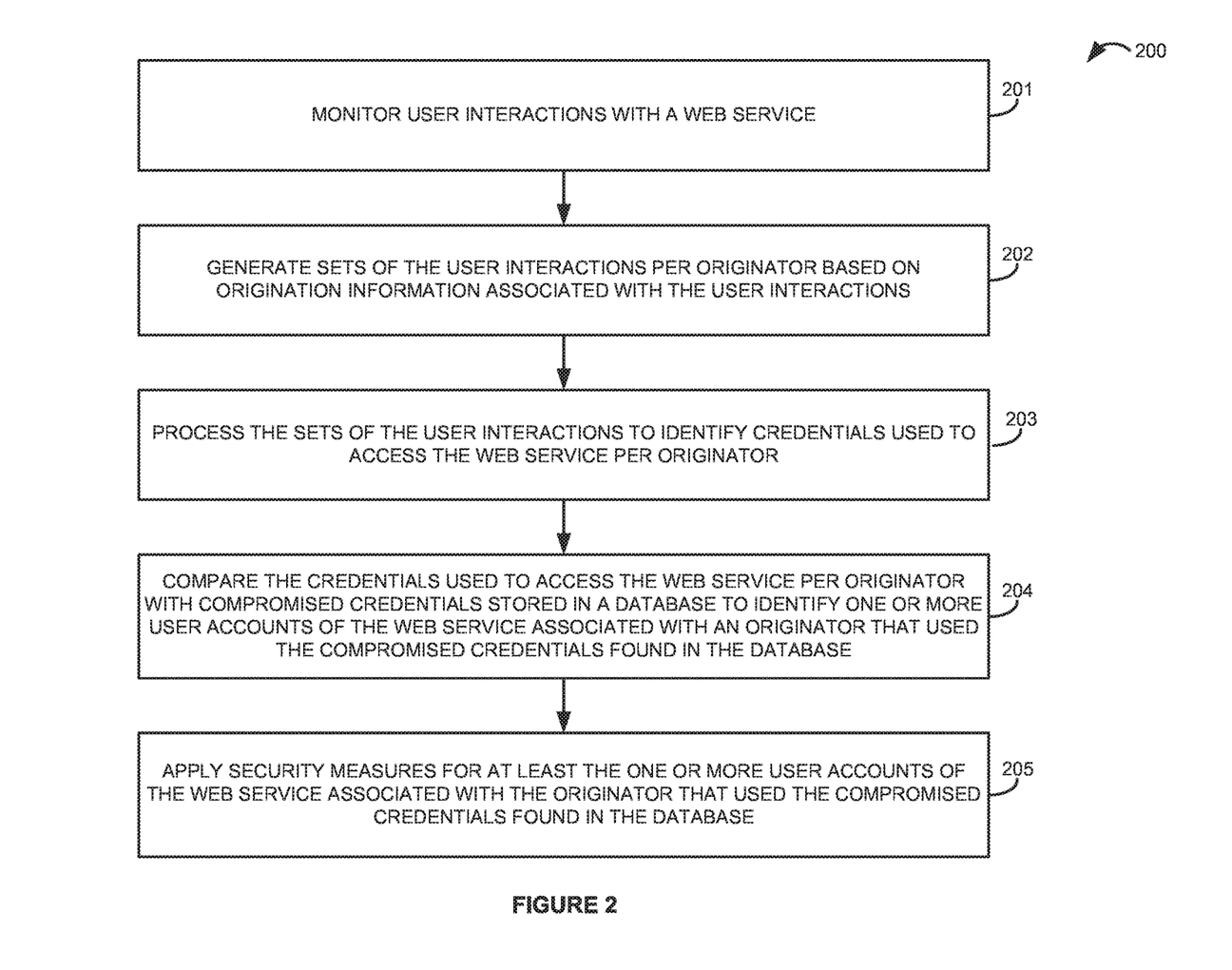
FIG. 2 is a flow diagram that illustrates an operation of the communication system.

FIG. 2 is a flow diagram that illustrates an operation 200 of communication system 100. The operation 200 shown in FIG. 2 may also be referred to as security process 200 herein. The steps of the operation are indicated below parenthetically. The following discussion of operation 200 will proceed with reference to server computing system 130 and other elements of FIG. 1 in order to illustrate its operations, but note that the details provided in FIG. 1 are merely exemplary and not intended to limit the scope of process 200 to the specific implementation shown in FIG. 1.

Operation 200 may be employed by server computing system 130 to facilitate securing web services from unauthorized access. As shown in the operational flow of FIG. 2, server computing system 130 monitors user interactions with a web service (201). The web service could comprise any service that may be provided over a communication network, such as streaming media, email, financial services, e-commerce, social media, online gaming services, or any other web service, including combinations thereof. Typically, the web service being monitored is also hosted by server computing system 130, although the web service could be provided by a different computing system in some implementations. The user interactions with the web service could include any traffic flows that occur between user computing devices 101-102 and the web service, but server computing system 130 would typically monitor user account logins, account registration/creation/modification, checkout processes, and other transactions associated with secure access to the web service.

Server computing system 130 generates sets of the user interactions per originator based on origination information associated with the user interactions (202). An originator could comprise any source of a user interaction that may be uniquely identified from origination information. For example, the origination information could comprise Internet Protocol (IP) addresses, Media Access Control (MAC) addresses, information associated with an application used to conduct the user interactions with the web service, device identifiers such as an Electronic Serial Number (ESN), Mobile Station Identifier (MSID), Mobile Equipment Identifier (MEID), and the like, and any other information that may be associated with the user interactions that may be used to uniquely identify the source of the interactions. Server computing system 130 generates sets of the user interactions per originator by grouping all of the user interactions that are associated with a particular originator based on the origination information associated with each of the user interactions. As shown in FIG. 1, computing device 101 is associated with originator A, and computing device 102 is associated with originator B. Note that each originator could potentially be associated with multiple different users, such as when the web service is accessed by many people consecutively from the same public terminal, or a malicious user attempting unauthorized access to several user accounts from the same device.

Server computing system 130 processes the sets of the user interactions to identify credentials used to access the web service per originator (203). Each of the user interactions typically relate to transactions conducted with the web service that require user credentials to authorize and effectuate. Server computing system 130 processes the sets of the user interactions that are grouped per originator to extract user credentials that were used by each of the originators to access the web service and conduct the interactions. In this manner, server computing system 130 identifies the credentials used to access the web service per originator.

Server computing system 130 compares the credentials used to access the web service per originator with compromised credentials stored in a database to identify one or more user accounts of the web service associated with an originator that used the compromised credentials found in the database (204). In communication system 100 of FIG. 1, credential database 140 provides an example of a database of compromised credentials. In some implementations, the database of compromised credentials may be generated by continually mining for stolen credentials from various sources. The credentials typically comprise username and password combinations that are needed for secure account access to various web services. Some examples of sources of compromised credentials include websites known to publically post credentials after security breaches, such as pastebin.com, other sites and underground forums used by cybercriminals where stolen credentials are traded, Internet Relay Chat (IRC) channels, Usenet groups, sites accessible over anonymity networks such as Tor, and any other sources. Server computing system 130 or some other computing system would typically acquire the compromised credentials from such sources of compromised credentials and store the compromised credentials in credential database 140. For each originator, server computing system 130 compares the credentials used to access the web service to the compromised credentials in credential database 140, and identifies one or more user accounts of the web service associated with an originator that used the compromised credentials found in database 140.

Server computing system 130 applies security measures for at least the one or more user accounts of the web service associated with the originator that used the compromised credentials found in database 140 (205). Server computing system 130 could employ various techniques to apply the security measures for the one or more user accounts. For example, server computing system 130 could increase a level of authentication required for the one or more user accounts to access the web service, such as requiring answers to security questions, account owner verification through confirmed means of contact such as email or cellular phone, requesting a personal identification number (PIN) associated with the account, or any other additional authentication techniques. In some implementations, the level of authentication required to access the web service could be increased if an originator is using credentials that match those found in the database of compromised credentials and other user attributes such as location, device information, and the like do not match the user's historical information. The security measures could also include blocking access to the web service for all access attempts associated with the originator. For example, if an originator is associated with the use of multiple credentials that match the database of compromised credentials, preventative measures can be taken to block the originator from accessing the web service.

In some implementations, server computing system 130 could apply the security measures for at least the one or more user accounts of the web service associated with the originator by sending automatic password reset notifications to owners of the one or more user accounts. In addition, server computing system 130 could determine other user accounts of the web service having passwords found in a same credential data source as the compromised credentials used by the one or more user accounts associated with the originator that used the compromised credentials, and responsively send automatic password reset notifications to owners of the other user accounts. Server computing system 130 could also receive a credential query transmitted from an authorized user of the web service, responsively compare legitimate credentials of the authorized user received in the credential query with the compromised credentials in the database, and transfer a notification for delivery to the authorized user that indicates whether or not the legitimate credentials of the authorized user appear in the database of compromised credentials. If the querying user's credentials are found in the database, this would allow the user to proactively reset passwords before they are exploited by malicious users. Note that the above security measures are merely exemplary, and many other security measures are possible and within the scope of this disclosure.

Advantageously, server computing system 130 tracks user interactions with a web service per originator and determines if credentials used to access the web service are present in the database of compromised credentials. If a particular originator is using credentials that match compromised credentials in the database, precautions can be taken to ensure the security of the affected user accounts. By identifying illegitimate requests to access user accounts using compromised credentials, the techniques described herein provide the technical advantage of reducing the load on the processor, network components, and other elements of server computing system 130, while also protecting the information of users of the web service. In this manner, the web service is better safeguarded against security attacks involving stolen account credentials.

Figure 3:
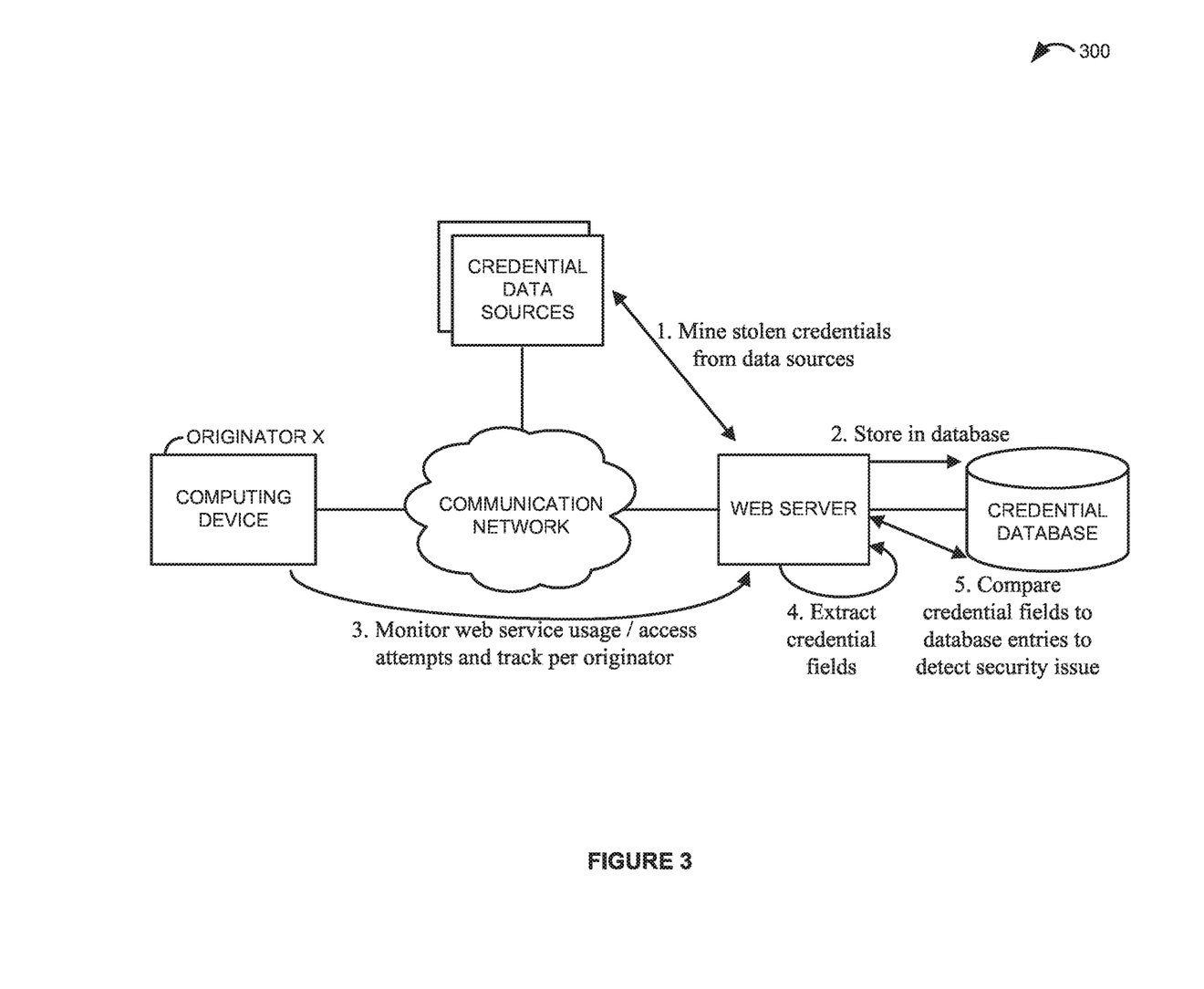
FIG. 3 is a block diagram that illustrates an operation of a communication system in an exemplary embodiment.

Referring now to FIG. 3, a block diagram is shown that illustrates an operation of communication system 300 in an exemplary embodiment. The techniques described in FIG. 3 could be executed by the elements of communication system 100 and could be combined with operation 200 of FIG. 2 in some implementations. Communication system 300 includes a computing device, communication network, web server, and credential database. The computing device and the web server communicate over the communication network. Credential data sources are accessible by the web server via the communication network. The web server is also linked to the credential database.

An operation of communication system 300 is described by the arrows and numerical designations labeled 1 through 5 on FIG. 3. In operation, a security application running on the web server mines for stolen credentials from the credential data sources to populate the credential database. In some implementations, the credential database could be populated by some other computing system that is not associated with hosting or securing a web service on the web server, but all of this functionality is attributed to the web server in this example to simplify the discussion. The credential data sources that are mined for stolen credentials include sites where users are known to post stolen credentials after security breaches, such as pastebin.com, websites and underground forums where stolen credentials are traded, and other sources where account credentials for web services are available on the black market. All of the credentials that are collected from the credential data sources are stored in the credential database and tagged on a per-source basis to keep track of where the stolen credentials were obtained.

The web server then monitors web service usage and access attempts. In particular, flows from end users to the web service are monitored, where credentials are used on the web service being protected. These flows include but are not limited to account login, registration, checkout, and any other user account activity. The flows are tracked on a per-originator basis. In some examples, an originator may be defined by any information that uniquely identifies the originator, such as a combination of an IP address and other network data and application information that could provide a unique signature for each originator. In this example, any user activity received from the computing device would be associated with "originator X", as shown on FIG. 3.

The credential fields of interest are then extracted from the flows to identify the username and password or other user account credentials that were used by each originator. In order to detect security issues, these extracted credentials are then compared to entries in the credential database that was created by mining various sources. Several actions can be taken depending on the security event detected.

In one example, if an originator is observed sending a large volume of credentials that match the credential database, preventative measures can be taken to block the originator from accessing the web service. Multiple credentials matching entries in the database that are all used by the same originator is indicative that the originator is a malicious user who is exploiting many stolen credentials.

In another example, if an originator is observed using credentials to access the web service that match the credential database, and other user attributes associated with those credentials such as location, device information, and the like do not match the user's historical information, then the level of authentication required to access the web service can be increased. The higher level of authentication could include requiring additional information from the user attempting to access the web service, such as requiring answers to security questions, account owner verification through confirmed means of contact such as email or cellular phone, requesting a personal identification number (PIN) associated with the account, or any other additional authentication techniques.

Automatic password reset notifications could also be sent to account owners whose compromised credentials are used in an attack, such as the events described above. For example, the account owner could be contacted by email, telephone, or some other contact method known to be valid for the owner in order to inform the account owner that the credentials were compromised and automatically reset by the web service in order to protect the security of the account. Automatic password reset notifications could also be sent proactively to other account owners whose credentials are part of the same credential data source and are also users of the web service being protected. For example, if a security attack is associated with credentials from a particular data source, any other user accounts with credentials also appearing in that credential data source are also at risk of a security breach, and those account passwords can be reset and the account owners notified. A web service can also be created where users can check if their credentials have been leaked and are included in the credential database, which will allow these users to take precautions to reset their passwords before they are misused. This lookup service could also function proactively to notify users of a web service whose credentials have appeared in the credential database.

The security techniques described above help to ensure that a web service is only accessed by legitimate account owners through detection and blocking of any suspicious account activity. By leveraging the database of stolen credentials, the web service has greater insight into possible account misuse, thereby providing improved defenses against malicious users.

Now referring back to FIG. 1, computing devices 101 and 102 each individually comprise a processing system and communication transceiver. Computing devices 101 and 102 may also include other components such as a user interface, data storage system, and power supply. Computing devices 101 and 102 may each reside in single devices or may be distributed across multiple devices. Examples of computing devices 101 and 102 include mobile computing devices, such as cell phones, tablet computers, laptop computers, notebook computers, and gaming devices, as well as any other type of mobile computing devices and any combination or variation thereof. Examples of computing devices 101 and 102 also include desktop computers, server computers, and virtual machines, as well as any other type of computing system, variation, or combination thereof.

Communication network 120 could comprise multiple network elements such as routers, gateways, telecommunication switches, servers, processing systems, or other communication equipment and systems for providing communication and data services. In some examples, communication network 120 could comprise wireless communication nodes, telephony switches, Internet routers, network gateways, computer systems, communication links, or some other type of communication equipment, including combinations thereof. Communication network 120 may also comprise optical networks, asynchronous transfer mode (ATM) networks, packet networks, local area networks (LAN), metropolitan area networks (MAN), wide area networks (WAN), or other network topologies, equipment, or systems—including combinations thereof. Communication network 120 may be configured to communicate over metallic, wireless, or optical links. Communication network 120 may be configured to use time-division multiplexing (TDM), Internet Protocol (IP), Ethernet, optical networking, wireless protocols, communication signaling, or some other communication format, including combinations thereof. In some examples, communication network 120 includes further access nodes and associated equipment for providing communication services to several computer systems across a large geographic region.

Server computing system 130 may be representative of any computing apparatus, system, or systems on which the techniques disclosed herein or variations thereof may be suitably implemented. Server computing system 130 comprises a processing system and communication transceiver. Server computing system 130 may also include other components such as a router, server, data storage system, and power supply. Server computing system 130 may reside in a single device or may be distributed across multiple devices. Server computing system 130 may be a discrete system or may be integrated within other systems, including other systems within communication system 100. Some examples of server computing system 130 include desktop computers, server computers, cloud computing platforms, and virtual machines, as well as any other type of computing system, variation, or combination thereof. In some examples, server computing system 130 could comprise a network switch, router, switching system, packet gateway, network gateway system, Internet access node, application server, database system, service node, firewall, or some other communication system, including combinations thereof.

Credential database 140 comprises a data storage system. In some implementations, credential database 140 could also comprise a processing system and communication transceiver. Credential database 140 may also include other components such as a router, server, and power supply. Credential database 140 may reside in a single device or may be distributed across multiple devices. Credential database 140 may be a discrete system or may be integrated within other systems, including other systems within communication system 100. In some examples, credential database 140 could comprise a database system, session initiation protocol (SIP) server, packet data serving node (PDSN), network switch, mobile switching center, router, switching system, packet gateway, network gateway system, Internet access node, application server, service node, firewall, or some other communication system, including combinations thereof.

Communication links 121, 122, 131, and 141 use metal, air, space, optical fiber such as glass or plastic, or some other material as the transport medium—including combinations thereof. Communication links 121, 122, 131, and 141 could use various communication protocols, such as TDM, IP, Ethernet, telephony, optical networking, hybrid fiber coax (HFC), communication signaling, wireless protocols, or some other communication format, including combinations thereof. Communication links 121, 122, 131, and 141 could be direct links or may include intermediate networks, systems, or devices.

Figure 4:
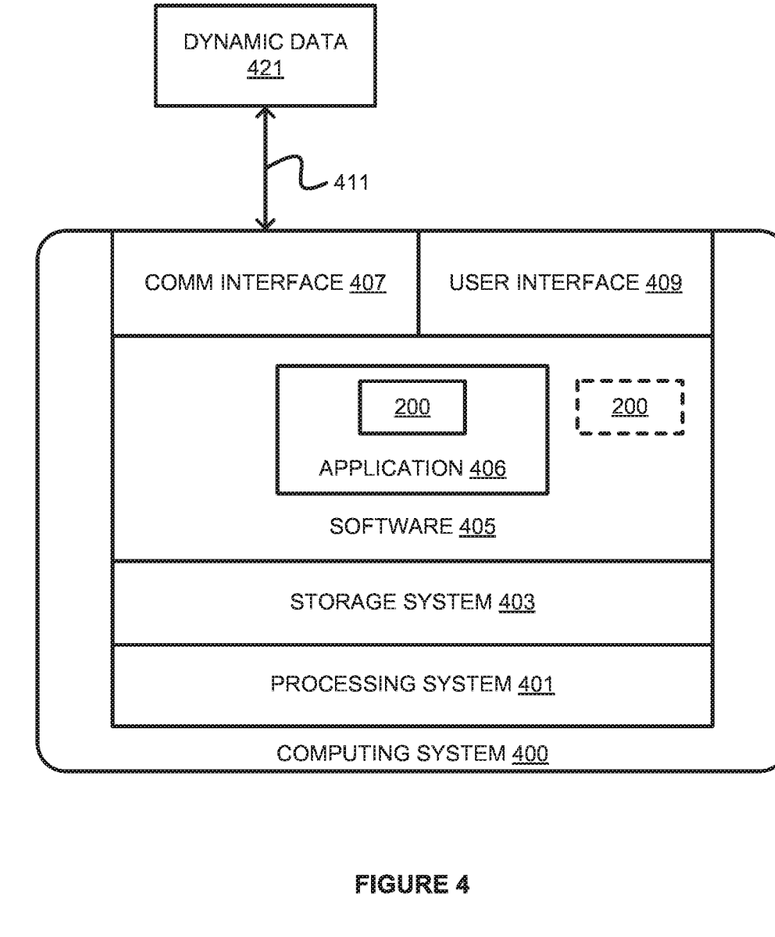
FIG. 4 is a block diagram that illustrates a computing system.

Referring now to FIG. 4, a block diagram that illustrates computing system 400 in an exemplary implementation is shown. Computing system 400 provides an example of server computing system 130, although system 130 could use alternative configurations. Computing system 400 could also provide an example of computing devices 101 and 102, although devices 101 and 102 could use alternative configurations. Computing system 400 includes processing system 401, storage system 403, software 405, communication interface 407, and user interface 409. Software 405 includes application 406 which itself includes security process 200. Security process 200 may optionally be implemented separately from application 406.

Computing system 400 may be representative of any computing apparatus, system, or systems on which application 406 and security process 200 or variations thereof may be suitably implemented. Examples of computing system 400 include mobile computing devices, such as cell phones, tablet computers, laptop computers, notebook computers, and gaming devices, as well as any other type of mobile computing devices and any combination or variation thereof. Note that the features and functionality of computing system 400 may apply as well to desktop computers, server computers, and virtual machines, as well as any other type of computing system, variation, or combination thereof.

Computing system 400 includes processing system 401, storage system 403, software 405, communication interface 407, and user interface 409. Processing system 401 is operatively coupled with storage system 403, communication interface 407, and user interface 409. Processing system 401 loads and executes software 405 from storage system 403. When executed by computing system 400 in general, and processing system 401 in particular, software 405 directs computing system 400 to operate as described herein for server computing system 130 for execution of security process 200 or variations thereof. Computing system 400 may optionally include additional devices, features, or functionality not discussed herein for purposes of brevity.

Referring still to FIG. 4, processing system 401 may comprise a microprocessor and other circuitry that retrieves and executes software 405 from storage system 403. Processing system 401 may be implemented within a single processing device but may also be distributed across multiple processing devices or sub-systems that cooperate in executing program instructions. Examples of processing system 401 include general purpose central processing units, application specific processors, and logic devices, as well as any other type of processing device, combinations, or variations thereof.

Storage system 403 may comprise any computer-readable media or storage media readable by processing system 401 and capable of storing software 405. Storage system 403 may include volatile and nonvolatile, removable and non-removable media implemented in any method or technology for storage of information, such as computer-readable instructions, data structures, program modules, or other data. Storage system 403 may be implemented as a single storage device but may also be implemented across multiple storage devices or sub-systems co-located or distributed relative to each other. Storage system 403 may comprise additional elements, such as a controller, capable of communicating with processing system 401. Examples of storage media include random-access memory, read-only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the storage media a propagated signal.

In operation, processing system 401 loads and executes portions of software 405, such as application 406 and/or security process 200, to facilitate securing web services from unauthorized access. Software 405 may be implemented in program instructions and among other functions may, when executed by computing system 400 in general or processing system 401 in particular, direct computing system 400 or processing system 401 to monitor user interactions with a web service and generate sets of the user interactions per originator based on origination information associated with the user interactions. Software 505 may further direct computing system 500 or processing system 501 to process the sets of the user interactions to identify credentials used to access the web service per originator. Software 505 also directs computing system 500 or processing system 501 to compare the credentials used to access the web service per originator with compromised credentials stored in a database to identify one or more user accounts of the web service associated with an originator that used the compromised credentials found in the database. Software 505 may further direct computing system 500 or processing system 501 to apply security measures for at least the one or more user accounts of the web service associated with the originator that used the compromised credentials found in the database.

Software 405 may include additional processes, programs, or components, such as operating system software or other application software. Examples of operating systems include Windows®, iOS®, and Android®, as well as any other suitable operating system. Software 405 may also comprise firmware or some other form of machine-readable processing instructions executable by processing system 401.

In general, software 405 may, when loaded into processing system 401 and executed, transform computing system 400 overall from a general-purpose computing system into a special-purpose computing system customized to facilitate securing web services from unauthorized access as described herein for each implementation. For example, encoding software 405 on storage system 403 may transform the physical structure of storage system 403. The specific transformation of the physical structure may depend on various factors in different implementations of this description. Examples of such factors may include, but are not limited to the technology used to implement the storage media of storage system 403 and whether the computer-storage media are characterized as primary or secondary storage.

In some examples, if the computer-storage media are implemented as semiconductor-based memory, software 405 may transform the physical state of the semiconductor memory when the program is encoded therein. For example, software 405 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 400 is generally intended to represent a computing system with which software 405 is deployed and executed in order to implement application 406, security process 200, and variations thereof. However, computing system 400 may also represent any computing system on which software 405 may be staged and from where software 405 may be distributed, transported, downloaded, or otherwise provided to yet another computing system for deployment and execution, or yet additional distribution. For example, computing system 400 could be configured to deploy software 405 over the internet to one or more client computing systems for execution thereon, such as in a cloud-based deployment scenario.

Communication interface 407 may include communication connections and devices that allow for communication between computing system 400 and other computing systems (not shown) or services, over a communication network 411 or collection of networks. In some implementations, communication interface 407 receives dynamic data 421 over communication network 411. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 409 may include a voice input device, a touch input device for receiving a gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface 409. In some examples, user interface 409 could include a touch screen capable of displaying a graphical user interface that also accepts user inputs via touches on its surface. The aforementioned user input devices are well known in the art and need not be discussed at length here. User interface 409 may also include associated user interface software executable by processing system 401 in support of the various user input and output devices discussed above. Separately or in conjunction with each other and other hardware and software elements, the user interface software and devices may provide a graphical user interface, a natural user interface, or any other kind of user interface. User interface 409 may be omitted in some implementations.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method to facilitate securing web services from unauthorized access, the method comprising:
   monitoring user interactions with a web service;
   generating sets of the user interactions per originator by grouping the user interactions per originator based on origination information associated with the user interactions, wherein the origination information includes network data and application information associated with applications used to conduct the user interactions with the web service that uniquely identify each originator;
   processing the sets of the user interactions that are grouped per originator to identify credentials used to access the web service per originator;
   comparing the credentials used to access the web service per originator with compromised credentials stored in a database to identify one or more user accounts of the web service associated with an originator that used the compromised credentials found in the database;
   determining whether the originator used multiple ones of the compromised credentials stored in the database to attempt to access the one or more user accounts of the web service;
   responsive to determining that the originator used the multiple ones of the compromised credentials, blocking the originator from access to the web service; and
   applying security measures for at least the one or more user accounts of the web service associated with the originator that used the compromised credentials found in the database.

2. The method of claim 1 wherein applying the security measures for at least the one or more user accounts of the web service associated with the originator comprises increasing a level of authentication required for the one or more user accounts to access the web service.

3. The method of claim 1 further comprising:
   automatically mining one or more credential data resources to identify the compromised credentials;
   tagging, on a per source basis, the compromised credentials to identify the one or more credential data resources from which the compromised credentials were obtained; and
   automatically populating the database with the compromised credentials identified by the mining.

4. The method of claim 1 wherein applying the security measures for at least the one or more user accounts of the web service associated with the originator comprises sending automatic password reset notifications to owners of the one or more user accounts.

5. The method of claim 1 further comprising determining other user accounts of the web service having passwords found in a same credential data source as the compromised credentials used by the one or more user accounts associated with the originator that used the compromised credentials, and responsively sending automatic password reset notifications to owners of the other user accounts.

6. The method of claim 1 further comprising receiving a credential query transmitted from an authorized user of the web service, responsively comparing legitimate credentials of the authorized user received in the credential query with the compromised credentials in the database, and transferring a notification for delivery to the authorized user that indicates whether or not the legitimate credentials of the authorized user appear in the database of compromised credentials.

7. An apparatus comprising:
   one or more processors;
   one or more non-transitory computer-readable storage media; and
   program instructions stored on the one or more non-transitory computer-readable storage media that, when executed by the one or more processors, direct a system to at least:
   monitor user interactions with a web service;
   generate sets of the user interactions per originator by grouping the user interactions per originator based on origination information associated with the user interactions, wherein the origination information includes network data and application information associated with applications used to conduct the user interactions with the web service that uniquely identify each originator;
   process the sets of the user interactions that are grouped per originator to identify credentials used to access the web service per originator;
   compare the credentials used to access the web service per originator with compromised credentials stored in a database to identify one or more user accounts of the web service associated with an originator that used the compromised credentials found in the database;
   determine whether the originator used multiple ones of the compromised credentials to attempt to access the one or more user accounts of the web service;
   responsive to determining that the originator used the multiple ones of the compromised credentials, block the originator from access to the web service; and apply security measures for at least the one or more user accounts of the web service associated with the originator that used the compromised credentials found in the database.

8. The apparatus of claim 7 wherein the one or more processors further direct the system to:
mine one or more credential data resources to identify the compromised credentials;
tag, on a per source basis, the compromised credentials to identify the one or more credential data resources from which the compromised credentials were obtained; and
automatically populate the database with the compromised credentials identified by the mining.

9. The apparatus of claim 7 wherein the program instructions direct the system to apply the security measures for at least the one or more user accounts of the web service associated with the originator by directing the system to increase a level of authentication required for the one or more user accounts to access the web service.

10. The apparatus of claim 7 wherein the program instructions direct the system to block the originator from access to the web service by directing the system to block access to the web service for all access attempts associated with the originator.

11. The apparatus of claim 7 wherein the program instructions direct the system to apply the security measures for at least the one or more user accounts of the web service associated with the originator by directing the system to send automatic password reset notifications to owners of the one or more user accounts.

12. The apparatus of claim 7 wherein the program instructions further direct the system to determine other user accounts of the web service having passwords found in a same credential data source as the compromised credentials used by the one or more user accounts associated with the originator that used the compromised credentials, and responsively send automatic password reset notifications to owners of the other user accounts.

13. The apparatus of claim 7 wherein the program instructions further direct the system to receive a credential query transmitted from an authorized user of the web service, responsively compare legitimate credentials of the authorized user received in the credential query with the compromised credentials in the database, and transfer a notification for delivery to the authorized user that indicates whether or not the legitimate credentials of the authorized user appear in the database of compromised credentials.

14. One or more non-transitory computer-readable storage media having program instructions stored thereon to facilitate securing web services from unauthorized access, wherein the program instructions, when executed by a processing system, direct the processing system to at least:
monitor user interactions with a web service;
generate sets of the user interactions per originator by grouping the user interactions per originator based on origination information associated with the user interactions, wherein the origination information includes network data and application information associated with applications used to conduct the user interactions with the web service that uniquely identify each originator;
process the sets of the user interactions that are grouped per originator to identify credentials used to access the web service per originator;
compare the credentials used to access the web service per originator with compromised credentials stored in a database to identify one or more user accounts of the web service associated with an originator that used the compromised credentials found in the database;
determine whether the originator used multiple ones of the compromised credentials to attempt to access the one or more user accounts of the web service;
responsive to determining that the originator used the multiple ones of the compromised credentials, block the originator from access to the web service; and
apply security measures for at least the one or more user accounts of the web service associated with the originator that used the compromised credentials found in the database.

15. The one or more non-transitory computer-readable storage media of claim 14 wherein the processing system is operatively coupled to the one or more non-transitory computer-readable storage media and the processing system reads and executes the program instructions.

16. The one or more non-transitory computer-readable storage media of claim 14 wherein the program instructions direct the processing system to apply the security measures for at least the one or more user accounts of the web service associated with the originator by directing the processing system to increase a level of authentication required for the one or more user accounts to access the web service.

17. The one or more non-transitory computer-readable storage media of claim 14 wherein the program instructions direct the processing system to block the originator from access to the web service by directing the processing system to block access to the web service for all access attempts associated with the originator.

18. The one or more non-transitory computer-readable storage media of claim 14 wherein the program instructions direct the processing system to apply the security measures for at least the one or more user accounts of the web service associated with the originator by directing the processing system to send automatic password reset notifications to owners of the one or more user accounts.

19. The one or more non-transitory computer-readable storage media of claim 14 wherein the program instructions further direct the processing system to determine other user accounts of the web service having passwords found in a same credential data source as the compromised credentials used by the one or more user accounts associated with the originator that used the compromised credentials, and responsively send automatic password reset notifications to owners of the other user accounts.

20. The one or more non-transitory computer-readable storage media of claim 14 wherein the program instructions further direct the processing system to receive a credential query transmitted from an authorized user of the web service, responsively compare legitimate credentials of the authorized user received in the credential query with the compromised credentials in the database, and transfer a notification for delivery to the authorized user that indicates whether or not the legitimate credentials of the authorized user appear in the database of compromised credentials.

* * * * *